United States Patent

[11] 3,549,127

[72] Inventor Juergen Niemann
 Sycamore, Ill.
[21] Appl. No. 688,800
[22] Filed Dec. 7, 1967
[45] Patented Dec. 22, 1970
[73] Assignee Ideal Industries, Inc.
 Sycamore, Ill.
 a corporation of Delaware

[54] FISH TAPE WINDER
 2 Claims, 4 Drawing Figs.
[52] U.S. Cl. .................................................. 254/134.3
[51] Int. Cl. ................................................. E21c 29/16
[50] Field of Search ................................... 254/134.3(FT);
 242/84.8, 85

[56] References Cited
 UNITED STATES PATENTS
2,446,020 7/1948 Nicholson ................... 242/84.8
3,355,123 11/1967 Schinske ..................... 242/84.8
3,067,984 12/1962 Linden ........................ 254/134.3

Primary Examiner—Robert C. Riordon
Assistant Examiner—David R. Melton
Attorney—Parker, Carter and Markey ABSTRACT: An electrician's fish tape reel assembly including an electrician's fish tape, a reel formed of a pair of annular sections which are removably connected to each other with the reel adapted to receive and hold the tape for winding and unwinding and a tape winder which is guided around the periphery of the reel. The tape winder is formed with a passage to guide the fish tape into and out of the reel and a drag surface which is positioned inside the reel and is adapted to engage the tape to maintain tension on the tape as it is wound into the reel.

PATENTED DEC 22 1970
3,549,127
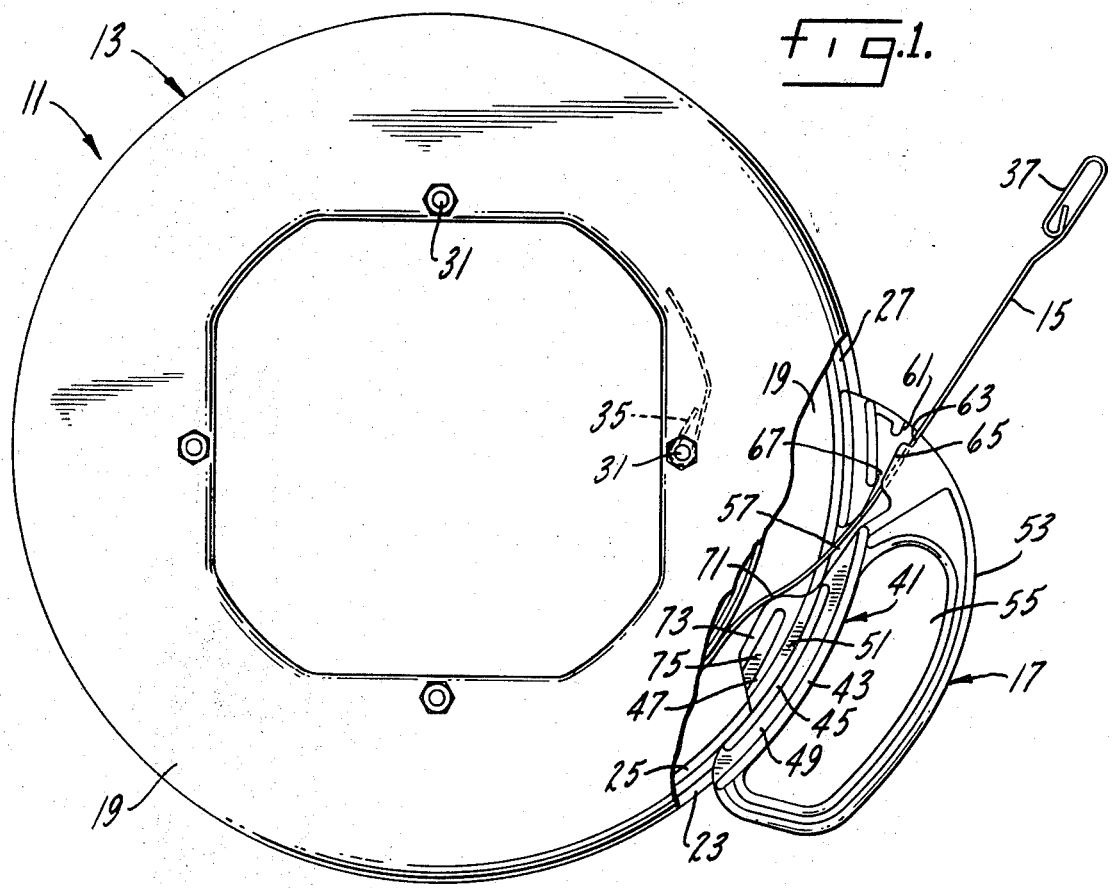
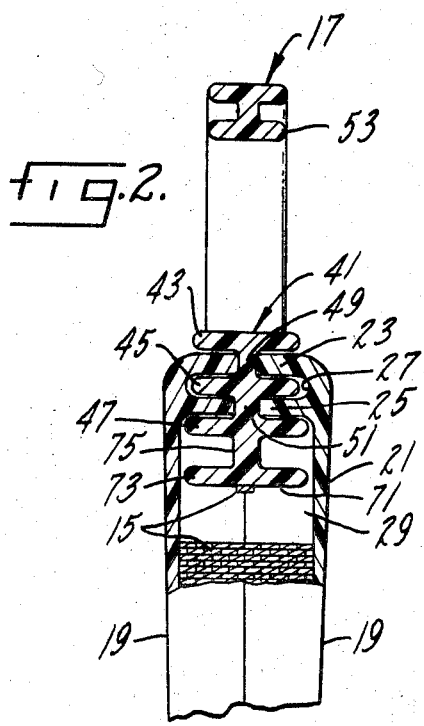
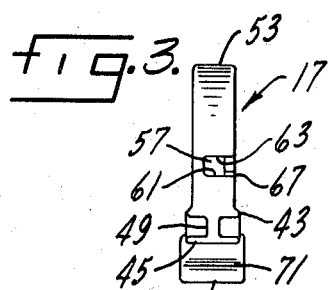
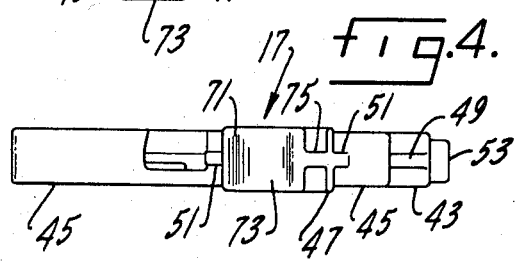
INVENTOR.
Juergen Niemann,
BY Parker & Carter
Attorneys.

3,549,127

FISH TAPE WINDER

SUMMARY OF THE INVENTION

This invention relates to a winder for an electrician's fish tape reel assembly and more particularly to a winder which tensions the fish tape during rewinding of the tape into the reel.

An object of this invention is a fish tape winder which will provide a frictional drag on a fish tape during winding to prevent jamming of the fish tape in the reel.

Another object is a fish tape winder in which the means to place a frictional drag on the fish tape includes a surface positioned within the reel.

Another object is a fish tape winder having a drag surface which is offset relative to the tape passage through the winder to force the tape to bend out of a straight line path from the reel through the winder.

Other objects will be found in the following specification, claims and drawings.

BRIEF DESCRIPTION OF THE DRAWINGS

The invention is illustrated more or less diagrammatically in the following drawings wherein:

FIG. 1 is a plan view of a fish tape, a reel and a winder of this invention with a portion of the reel broken away for clarity of illustration;

FIG. 2 is an enlarged partial cross-sectional view of the structure of FIG. 1;

FIG. 3 is an end elevational view of the winder of FIG. 1; and

FIG. 4 is a bottom plan view of the winder of FIG. 1.

DESCRIPTION OF THE PREFERRED EMBODIMENT

A fish tape reel assembly 11 embodying the novel features of the invention is shown in FIG. 1. This assembly includes a reel 13, a fish tape 15 and a fish tape winder 17. The reel 13 is made of two identical generally annular-shaped sections 19 which may be formed of a plastic such as high density polyethylene. As seen in FIG. 2, each reel section 19 has a generally flat radial or sidewall 21, an upstanding outer peripheral wall 23 and an upstanding wall 25 located inwardly of wall 23. Wall 25 is not as high as wall 23. An annular channel 27 is defined by the walls 21, 23 and 25. A tape storage compartment 29 is formed between the reel sections 19 inwardly of the upstanding walls 25.

The reel sections 19 may be removably connected together in any suitable manner. In the embodiment shown in the drawings, threaded fasteners 31 extend through aligned pairs of openings (not shown) in the reel sections 19 to hold the reels together or to prevent unlocking rotation of the sections 19 if, for example, they are threadedly connected together. The fish tape 15 is adapted to fit in the tape storage compartment 29 with the looped bitter end 35 of the tape secured to one of the threaded fasteners. The free end 37 of the fish tape is positioned to extend outwardly of the reel 13 between the walls 23 and 25 of the reel sections.

The tape winder 17 is generally flat and irregularly shaped and preferably may be molded of a plastic such as polycarbonate. The tape winder has an arcuate-shaped guide portion 41 consisting of a flange 43, a flange 45 and a flange 47 which are connected respectively by center webs 49 and 51. A handle portion 53 is formed as an integral part of the tape winder. An opening 55 is formed in the handle portion to facilitate manipulation of the winder.

A transversely extending generally straight passage in the shape of an open channel 57 is formed in one side of the tape winder 17 and extends through the flanges 43 and 45 and across the web 49. This channel is adapted to receive the fish tape 15 and is bounded by sidewalls 61 and 63. A tape retainer 65 extends across the top of the channel from the sidewall 63 leaving a slot 67 of sufficient width between the retainer and the channel sidewall 61 to insert a tape.

A drag surface 71 to engage the tape is formed at the end of a curved flange 73 which is attached to and extends from the flange 47. A web 75 joins the remainder of the flange 73 to the flange 47. The drag surface 71 is offset relative to the channel 57 so as to bend the tape out of a straight line path from the reel through the winder and thereby tension the tape as it is rewound into the reel.

The use, operation, and function of the invention are as follows:

In using the reel assembly 11, the tape 15 will engage and spread the outer walls 23 of the reel sections 19 as it is pulled out of the reel and through the tape winder. The tape may be unreeled by a user by grasping the reel handle 53 in one hand and by pulling the tape with his other hand. Pulling of the tape in this manner causes the reel 13 to rotate while the winder 17 which is held by the user remains stationary. During unwinding, tension is maintained on the tape by engagement of the tape with the walls 23 of the reel sections, with the drag surface 71 and with the walls 61 and 63 forming the channel 57 of the winder.

The user may rewind the tape into the reel by grasping the winder in one hand and rotating the reel 13 relative to the winder with his other hand. During rewinding of the tape into the reel, the drag surface 71 will add tension to the tape by engaging it and bending it slightly out of a straight line path from the reel to the channel 57 of the winder in the manner shown in FIG. 1. The tensioning of the tape will insure that it will wind tightly into the storage compartment 29 of the reel.

Wherein a preferred embodiment of the invention has been shown and described, it should be understood that there are many modifications, substitutions and alterations thereto that may be made by one skilled in the art. Therefore, the scope of the invention should only be limited by the following claims.

I claim:

1. A tape winder for use with a fish tape reel having outer peripheral walls defining a circumferentially extending opening, said tape winder including laterally extending flanges adapted to engage and be guided on said outer peripheral walls of said reel for circumferential movement around the reel, a passage extending through the tape winder to receive and guide a fish tape into and out of the reel, and a drag surface formed on another flange of the tape winder which is positioned radially inwardly of the peripheral walls from said laterally extending flanges and adapted to engage the fish tape during winding of the tape into the reel.

2. A tape winder for use with a fish tape reel having outer peripheral walls defining a circumferentially extending opening, said tape winder including means to engage and be guided on said outer peripheral walls of said reel for circumferential movement about the reel, a passage extending through the tape winder to receive and guide a fish tape into and out of the reel, and a drag surface formed on the tape winder and positioned inside the reel to engage the fish tape during winding of the tape into the reel, said drag surface being offset relative to said passage so as to bend said tape from a straight line path during winding into the reel.